United States Patent
Usui (10) Patent No.: US 7,209,767 B2
(45) Date of Patent: Apr. 24, 2007

(54) CELLULAR PHONE SUPPRESSING DEGRADATION OF RECEIVING SENSITIVITY

(75) Inventor: Hisayoshi Usui, Saitama (JP)

(73) Assignee: NEC Corporation, Tokyo (JP)

( * ) Notice: Subject to any disclaimer, the term of this patent is extended or adjusted under 35 U.S.C. 154(b) by 517 days.

(21) Appl. No.: 10/731,141

(22) Filed: Dec. 10, 2003

(65) Prior Publication Data
US 2004/0116168 A1 Jun. 17, 2004

(30) Foreign Application Priority Data
Dec. 11, 2002 (JP) .............................. 2002-359281

(51) Int. Cl.
*H04B 1/38* (2006.01)
*H04M 1/00* (2006.01)

(52) U.S. Cl. .................... 455/556.1; 455/566; 455/310

(58) Field of Classification Search ............ 455/550.1, 455/556.1, 66.1, 296, 310, 311, 312, 343.1, 455/566; 348/207
See application file for complete search history.

(56) References Cited

U.S. PATENT DOCUMENTS

| 5,471,663 A | 11/1995 | Davis |
| 5,604,928 A * | 2/1997 | Hamano et al. ............ 455/310 |
| 5,765,113 A * | 6/1998 | Russo et al. ............... 455/557 |
| 5,838,741 A | 11/1998 | Callaway, Jr. et al. |
| 5,949,812 A * | 9/1999 | Turney et al. ............. 375/130 |
| 6,222,985 B1 * | 4/2001 | Miyake ..................... 386/117 |
| 6,381,476 B1 | 4/2002 | Yoshida |
| 6,894,982 B1 * | 5/2005 | Shimizu .................... 370/252 |
| 2001/0044286 A1 * | 11/2001 | Watanabe ................. 455/231 |
| 2001/0053703 A1 * | 12/2001 | Kobayashi ................ 455/556 |
| 2002/0104890 A1 * | 8/2002 | Yoshimoto et al. ........ 235/492 |
| 2003/0071901 A1 * | 4/2003 | Katagiri et al. .......... 348/211.2 |
| 2006/0148537 A1 * | 7/2006 | Perez et al. ............. 455/575.1 |

FOREIGN PATENT DOCUMENTS

| JP | 2-141034 A | 5/1990 |
| JP | 4-7921 A | 1/1992 |
| JP | 9-44278 A | 2/1997 |
| JP | 2000-184418 A | 6/2000 |
| JP | 2002-261880 A | 9/2002 |
| WO | WO 01/39406 A2 | 5/2001 |

* cited by examiner

*Primary Examiner*—Nguyen T. Vo
(74) *Attorney, Agent, or Firm*—Sughrue Mion, PLLC (57) ABSTRACT

A cellular phone includes a radio circuit block, and a control block including a CPU for controlling operations of the cellular phone and treating data for the cellular phone. The control block retains an interrupt signal when the radio circuit block receives a radio signal, and delivers the interrupt signal to the CPU after completion of the receipt of the radio signal by the radio circuit block.

16 Claims, 14 Drawing Sheets

CELLULAR PHONE SUPPRESSING DEGRADATION OF RECEIVING SENSITIVITY

BACKGROUND OF THE INVENTION (a) Field of the Invention

The present invention relates to a cellular phone, and a method and a program used in the cellular phone, and more specifically, an improvement of the receiving sensitivity for a radio frequency signal in the cellular phone.

(b) Description of the Related Art

Figure 12:
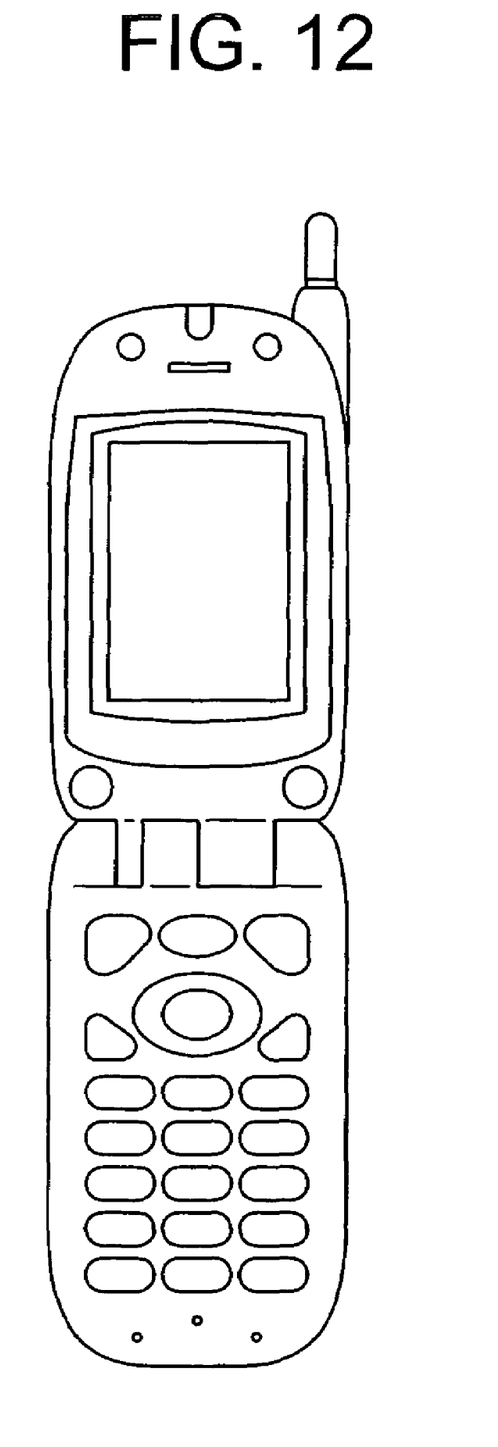
FIG. 12 is a perspective view of an unfolded state of a fold-type cellular phone to which the present invention can be applied.

A variety of clock frequencies are used in a cellular phone, such as shown in FIG. 12 showing a typical fold-type cellular phone. It is known in a general cellular phone that, if an integral multiple of a clock frequency used in the cellular phone coincides with the radio frequency, the receiving sensitivity for receiving the radio frequency signal is degraded in the radio channel using the radio frequency signal. It is also known that, if an integral multiple of one of frequency components in the transmission signal coincides with the radio frequency during transmission of data by using a data bus in the cellular phone, the receiving sensitivity for receiving the radio frequency signal is degraded.

Figure 13:
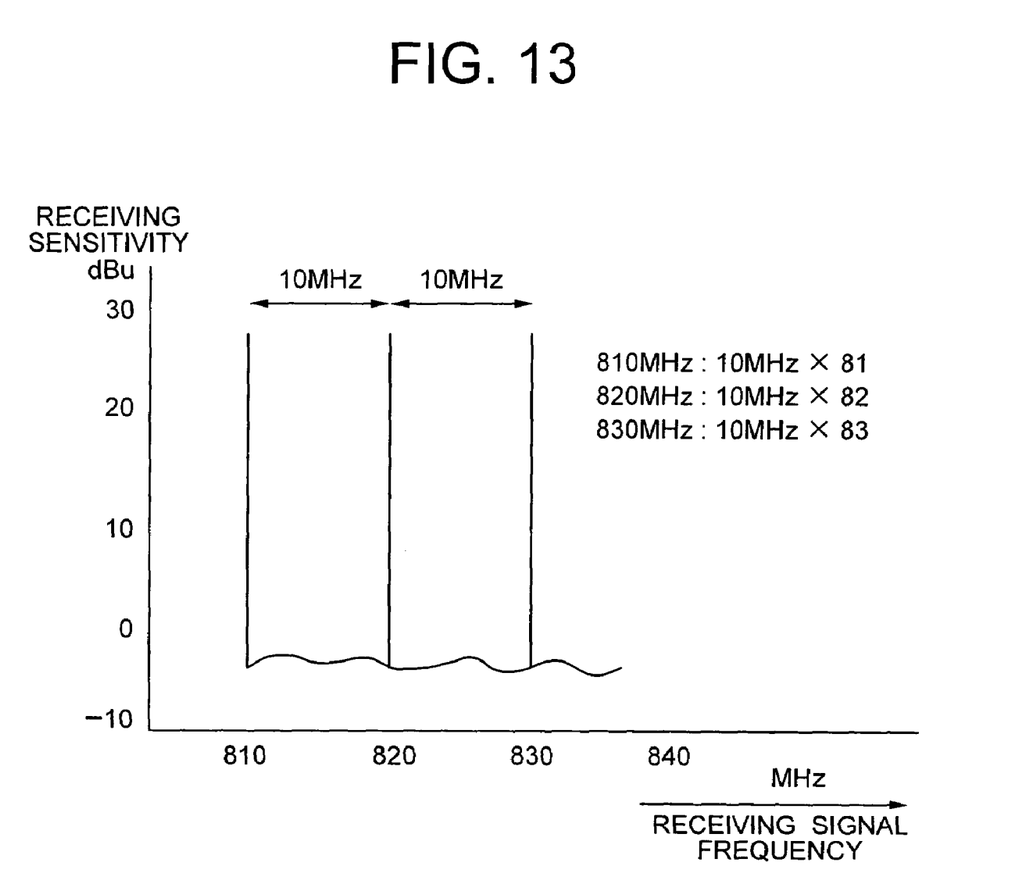
FIG. 13 is a graph representing the receiving sensitivity characteristic of all the channels in the cellular phone of FIG. 12.

FIG. 13 exemplarily shows the results of measurements of the receiving sensitivity of all the receiving channels in the cellular phone FIG. 13 is obtained for the case where a 10-MHz clock frequency is used as a synchronizing frequency of a data bus. As understood from the figure, the receiving sensitivity is significantly degraded at 81-, 82- and 83-times the 10-MHz synchronizing frequency of the data bus.

Figure 14A:
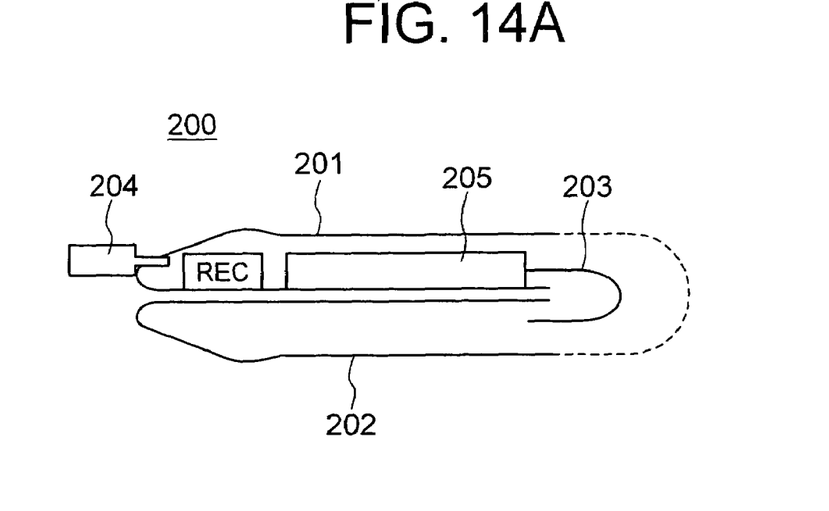
FIGS. 14A and 14B are side views of the cellular phone of FIG. 12, in the folded position and the unfolded position, respectively, thereof.
Figure 14B:
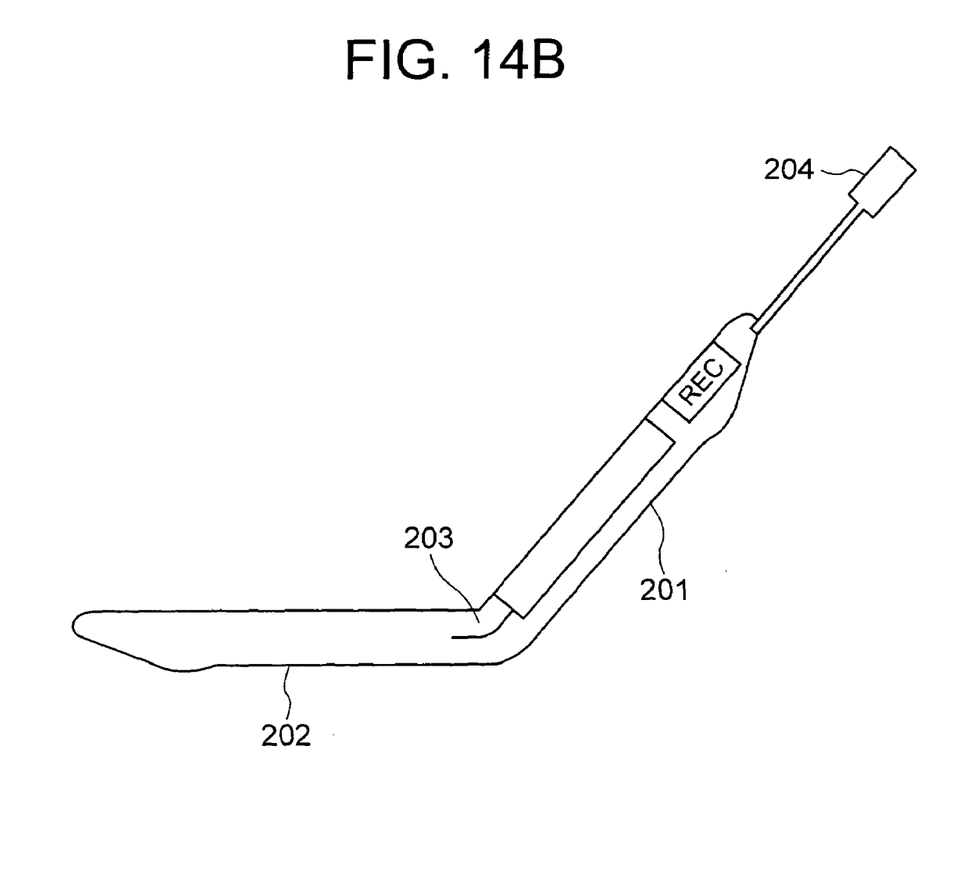

A fold-type cellular phone, such as shown in FIGS. 14A and 14B, having a top chassis section 201 mounting thereon a display unit 205 and a bottom chassis section 201 mounting thereon a keyboard (not shown) is increasingly used among the cellular phones having camera units thereon. The degradation of the receiving sensitivity is especially recognized for the case where a flexible printed circuit board 203 coupling together the top chassis 201 and the bottom chassis section 202 irradiates the 10 MHz synchronizing frequency as described above, and thus the antenna 204 of the cellular phone 200 receives the irradiated synchronizing frequency. It is to be noted that the camera unit may be provided on the top chassis section 201, although not specifically shown in FIGS. 12 and 13.

Figure 7:
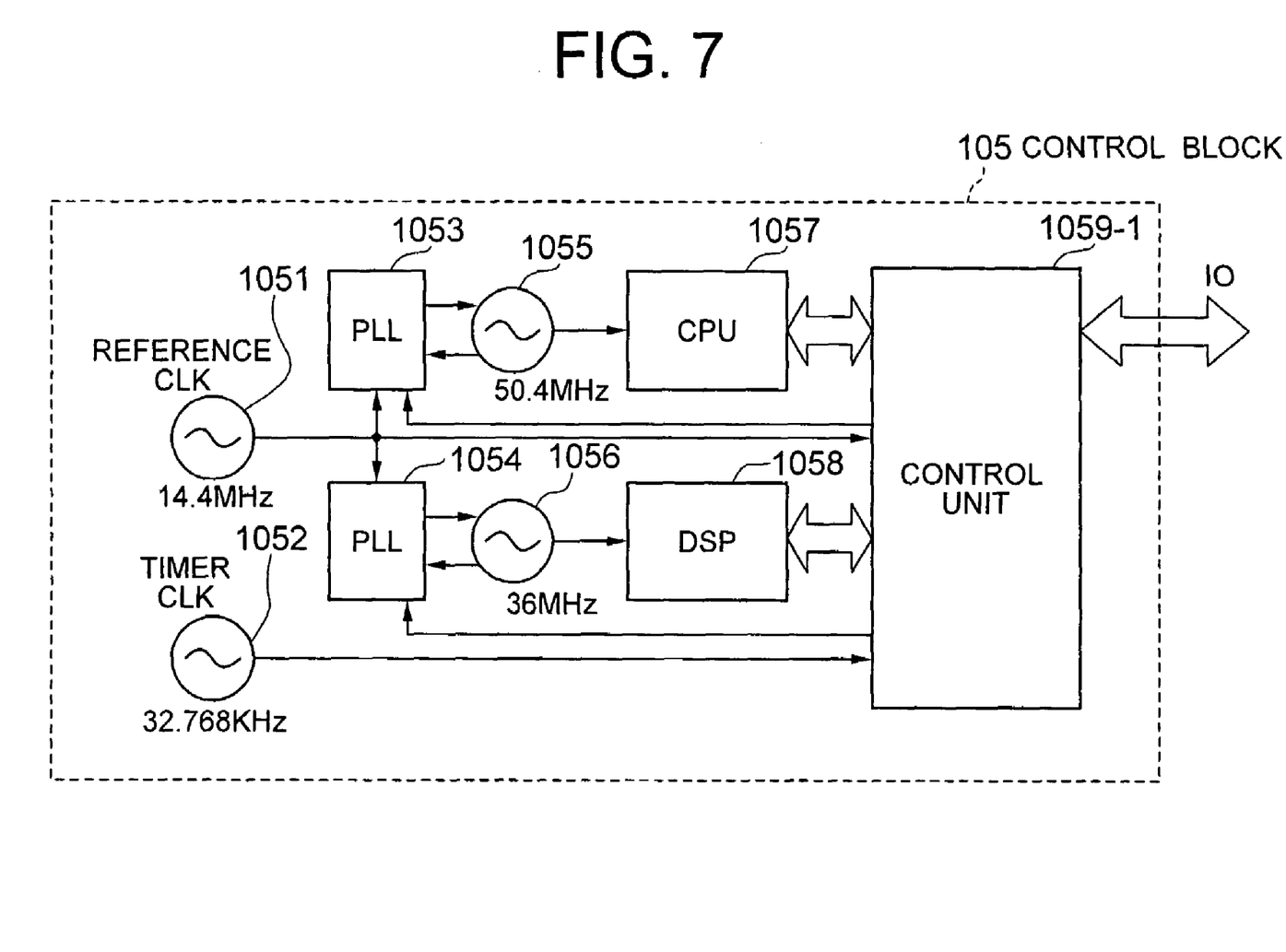
FIG. 7 is a detailed block diagram of an exemplified control block of a typical cellular phone.

For example, in a typical cellular phone such as shown in FIG. 7, the control block 105 controlling the overall operation of the cellular phone includes a first clock generator 1051, a second clock generator 1052, PLL circuits 1053 and 1054. PLL circuit 1053 divides the system frequency of 14.4 MHz supplied from the first clock generator 1051 by four to generate a first system clock having a frequency of 3.6 MHz. The oscillation frequency of a voltage controlled oscillator 1055 receiving an output from PLL circuit 1053 is multiplied by fourteen and delivered to a CPU 1057 as a 50.4 MHz CPU clock after being synchronized with the 3.6 MHz first system clock.

PLL circuit 1054 divides the system frequency supplied from the first clock generator 1051 by four to generate a 3.6 MHz second system clock. The oscillation frequency of a voltage controlled oscillator 1056 is multiplied by ten and delivered to a DSP 1058 as a 36 MHz DSP clock after being synchronized with the 3.6 MHz second system clock.

Figure 8:
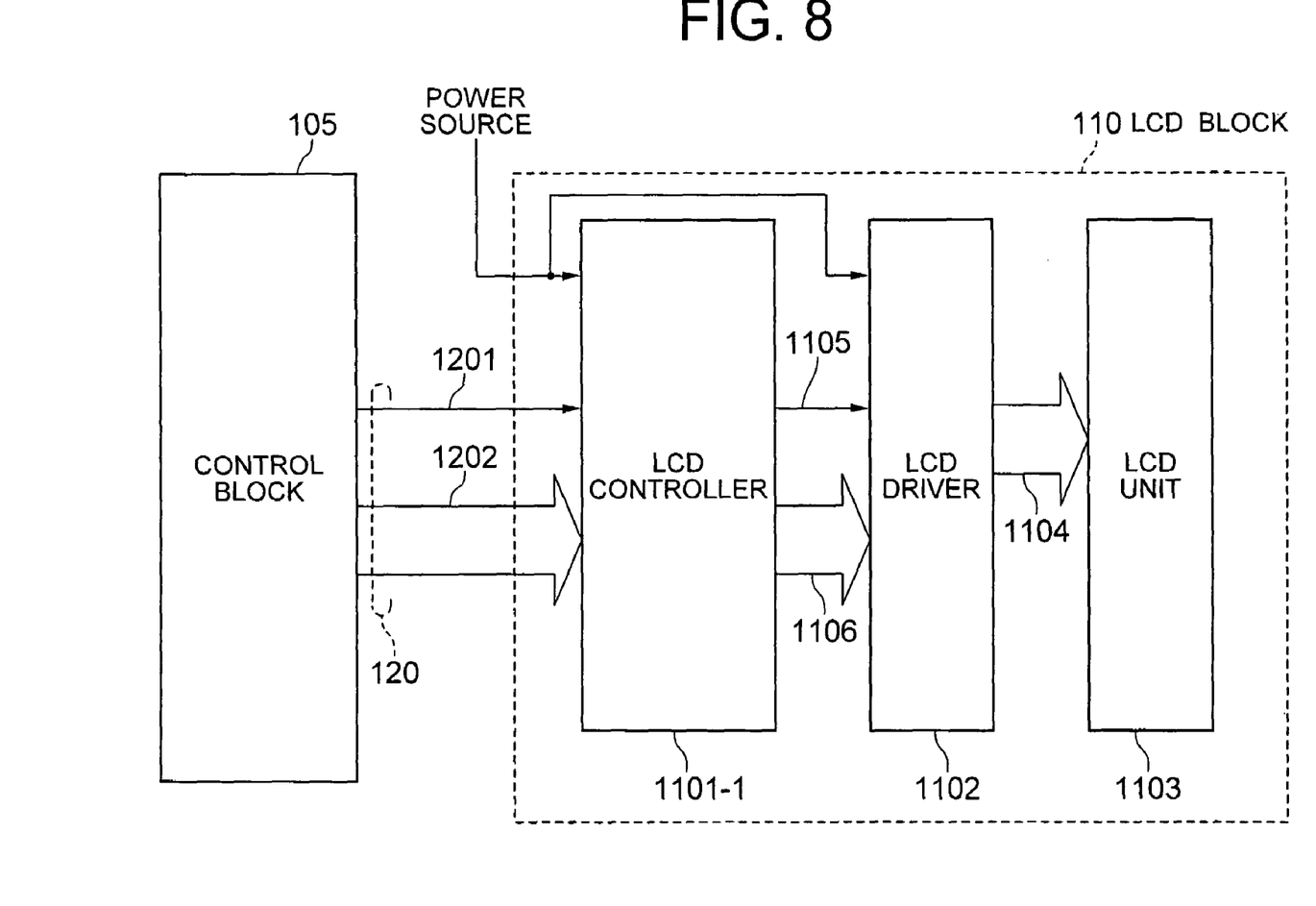
FIG. 8 is a detailed block diagram of the LCD block in the typical cellular phone.
Figure 9:
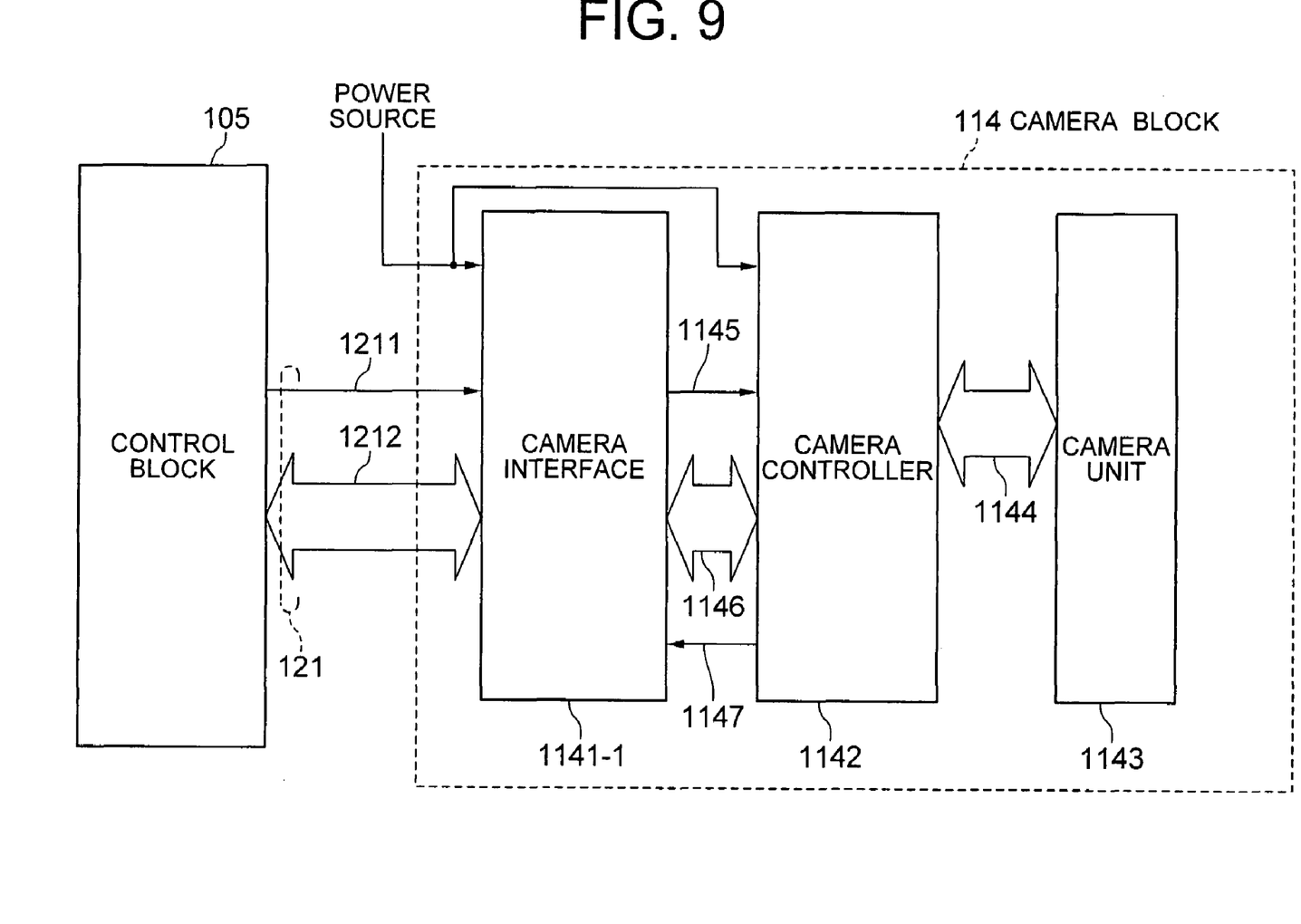
FIG. 9 is a detailed block diagram of the camera block in the typical cellular phone.

Referring to FIG. 8 showing a display block (LCD block) 110 of the typical cellular phone, an LCD controller 1101-1 receiving the CPU clock 1201 from the control block 105 divides the CPU clock by five to deliver a data clock signal having a frequency of 10.08 MHz. Referring to FIG. 9 showing a camera block 114 of the typical cellular phone, a camera interface 1141-1 divides the CPU clock supplied from the control block 105 by six to deliver a data clock signal having a frequency of 8.4 MHz.

In the typical cellular phone, if a radio signal is received during operation of the LCD block 110, a degradation problem as to the receiving sensitivity occurs in the cellular phone. JP Patent Laid-open Publication 2000-184418 describes a technique for solving the above problem by delaying the output of the AC driving signal, horizontal scanning signal and frame signal in the LCD block until the receipt of the radio signal is completed, thereby suppressing noise caused by angle rotation of the LC molecules and thus suppressing degradation of the receiving sensitivity during the receipt of the radio signal.

In the described technique, however, there still occurs another degradation of the receiving sensitivity in the frequencies corresponding to integral multiples of the 3.6 MHz reference frequency, 10.08 MHz data clock frequency in the LCD block, and 8.4 MHz data clock frequency in the camera block.

In addition, data transmission through buses between the CPU and memory, between the CPU and LCD block, and between the CPU and camera block also degrades the receiving sensitivity in the cellular phone. Moreover, the described technique complicates the structures and control of the cellular phone.

The CPU disposed in the control block 105 operates for data processing at any time the data processing is requested. More specifically, if a data processing occurs, the CPU starts for the data processing, and stops after the completion of the data processing. In such a case, transmission of data through the data bus by the CPU may cause a significant degradation of the receiving sensitivity.

Figure 10:
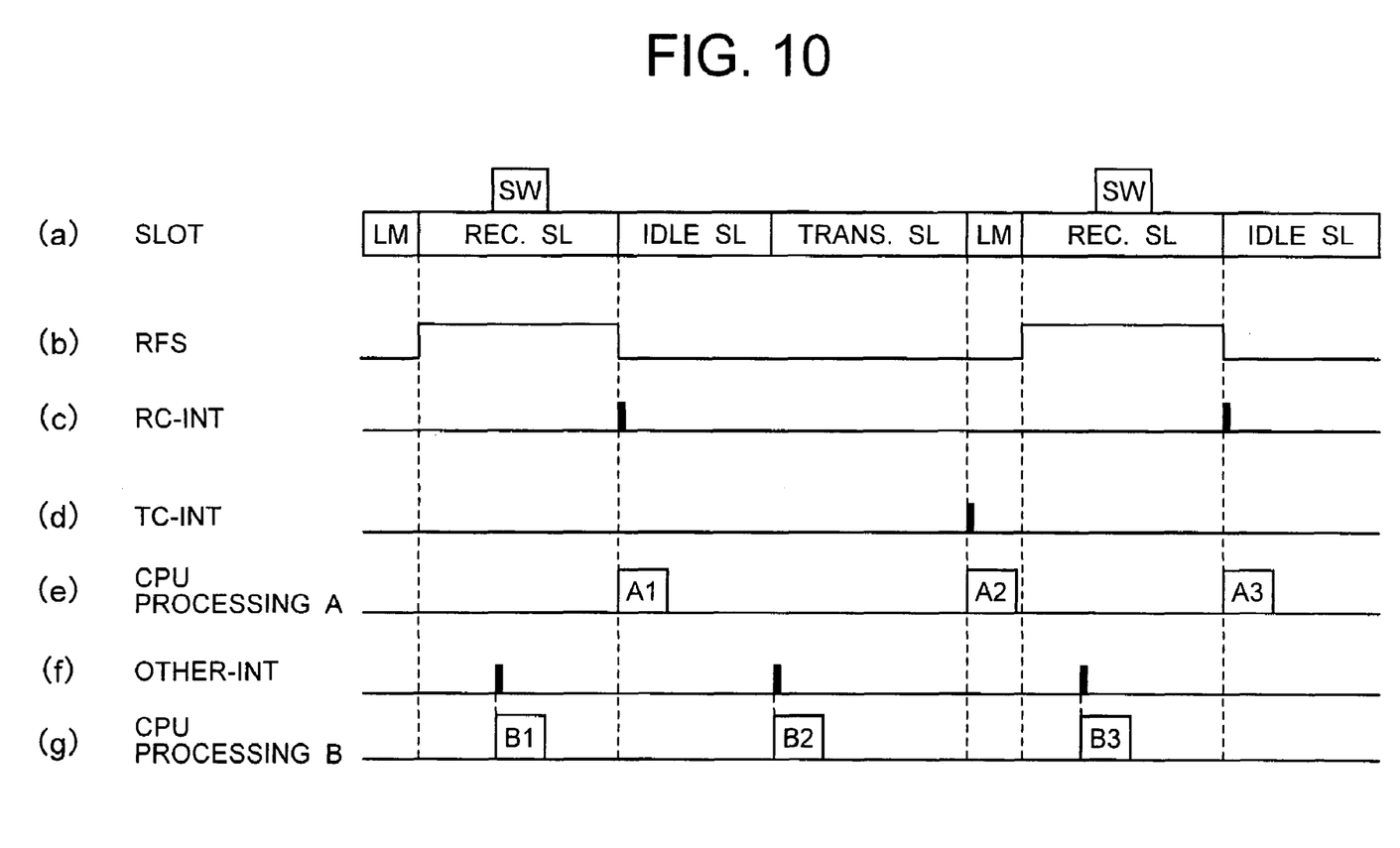
FIG. 10 is a timing chart of the operation in the CPU in the typical cellular phone during data receipt/transmission.

For example, in the processings shown in FIG. 10, when an interrupt signal is generated after completion of signal receipt, the CPU operates for processings A1 and A3, which do not cause any degradation of the receiving sensitivity because the processings A1 and A3 are out of the timing of the receiving slot. When another interrupt signal is generated after completion of a signal transmission, the CPU operates for processing A2, which does not cause any degradation of the receiving sensitivity because the processing A2 is out of the timing of the receiving slot.

When other interrupt signals are generated due to the operation on the man-machine interface, the CPU operates for data processings such as processings B1, B2 and B3, among which processings B1 and B3 may cause a degradation of the receiving sensitivity whereas processing B2 dose not cause any degradation. This is because the processings B1 and B3 are within the timing of the receiving slot and processing B2 is out of the timing of the receiving slot. The degradation of the receiving sensitivity caused by the processings B1 and B3 may be involved with the data transmission through the data bus during the CPU processings.

Figure 11:
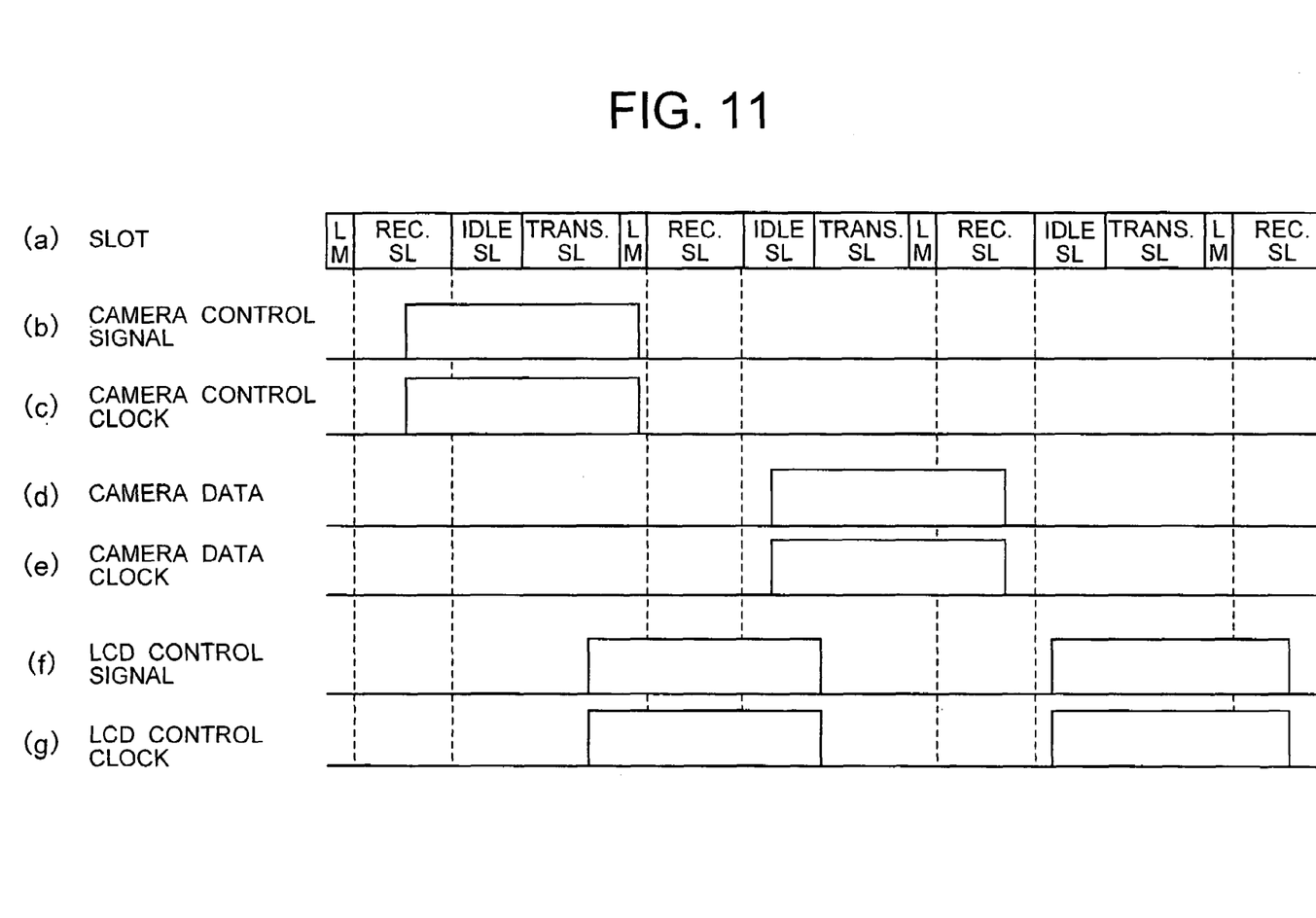
FIG. 11 is a timing chart of the control operations in the LCD block and the camera block during data receipt/transmission.

Further, as shown in FIG. 11, processings by the LCD block and the camera block may cause a degradation of the receiving sensitivity because these blocks operate for processings at random in asynchrony with the time division multiple access (TDMA) timing, and may fall within the timing of the receiving slot. In FIG. 11, camera control signal and camera data as well as the LCD control signal are delivered during the receiving slot. This may cause degradation of the receiving sensitivity.

It is an object of the present invention to provide a cellular phone, and a method and a program for suppressing a degradation of the receiving sensitivity in the cellular phone.

The present invention provides a cellular phone including: a radio circuit block including an antenna; an analog baseband block connected to the radio circuit block; a digital baseband block connected to the analog baseband block; and a control block for controlling operation of the blocks, the control block including a central processing unit (CPU) for treating data input from the blocks and the keyboard, the radio circuit block receiving a radio signal through the antenna during a receiving slot, wherein the control block stops operation of the CPU during the receiving slot.

The present invention also provides a cellular phone including: a radio circuit block including an antenna; an analog baseband block connected to the radio circuit block; a digital baseband block connected to the analog baseband block; at least one of display block and camera block, and a control block for controlling operation of the blocks, the control block including a central processing unit (CPU), the radio circuit block receiving a radio signal through the antenna during a receiving slot, wherein the at least one of display block and camera block stops data transmission through an associated bus during the receiving slot.

The present invention also provides a method for controlling a cellular phone having a CPU for controlling operation of the cellular phone and treating data in the cellular phone, the method including the step of: detecting a receiving slot to activate a receiving frame signal; retaining an interrupt signal during a time interval when the receiving frame signal is active; delivering the interrupt signal to the CPU after the receiving frame signal is inactivated; and operating the CPU for processing corresponding to the interrupt signal.

The present invention also provides a program stored in a medium for running on a CPU in a cellular phone, the program defining the steps of: detecting a receiving slot to activate a receiving frame signal; retaining an interrupt signal during a time interval when the receiving frame signal is active; delivering the interrupt signal to the CPU after the receiving frame signal is inactivated; and operating the CPU for processing corresponding to the interrupt signal.

In accordance with the cellular phone, method and program of the present invention, since at least one of operation of the CPU and transmission of data through the data bus is stopped during the receiving slot, the receiving sensitivity is not degraded in the receiving slot by the at least one of the operation of CPU and the transmission of the data.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings.

Figure 1:
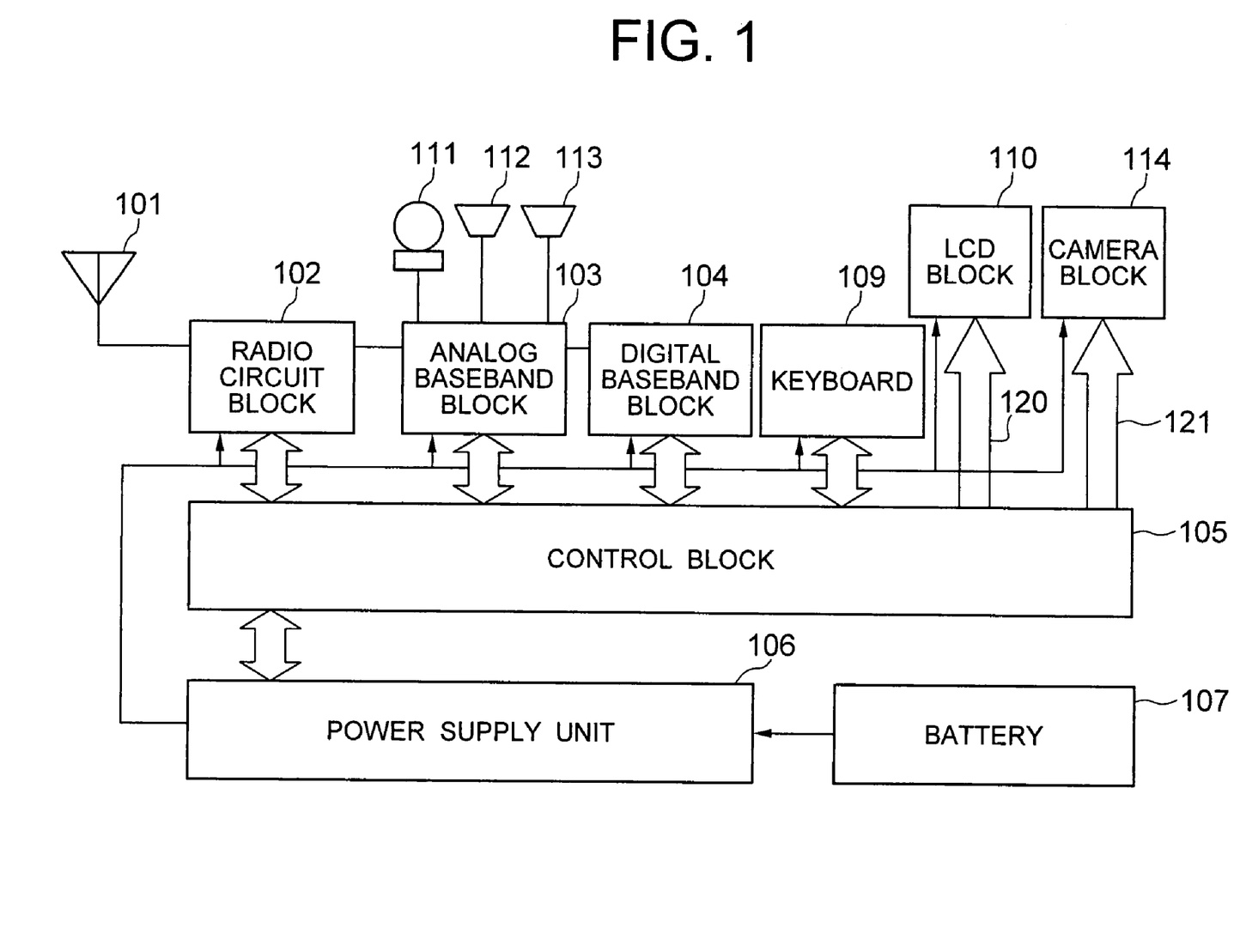
FIG. 1 is a block diagram of a cellular phone according to an embodiment of the present invention wherein the present invention is applied to a typical cellular phone such as shown in FIG. 12.

Referring to FIG. 1, there is shown a cellular phone according to an embodiment of the present invention in a block diagram. In FIG. 1, an antenna 101 is connected to a radio circuit block 102, the output of which is connected to an analog baseband block 103. The analog baseband block 103 is connected to a microphone 111, a speaker 112, a receiver 113 and a digital baseband block 104.

A battery 107 is connected to a power supply unit 106, which delivers the power source to the radio circuit block 102, analog baseband block 103, digital baseband block 104, a control block 105, a keyboard 109, an LCD block 110 and a camera block 114.

The control block 105 is connected to the radio circuit block 102, analog baseband block 103, digital baseband block 104, keyboard 109 and power source unit 106 for controlling operation of these units and blocks. The control block 105 is also connected to buses 120 and 121 configured by flexible printed circuit boards, and connected to the LCD block 110 and cameral block 114. The configurations as described heretofore in connection with the cellular phone of FIG. 1 are similar to those of a conventional cellular phone.

Figure 2:
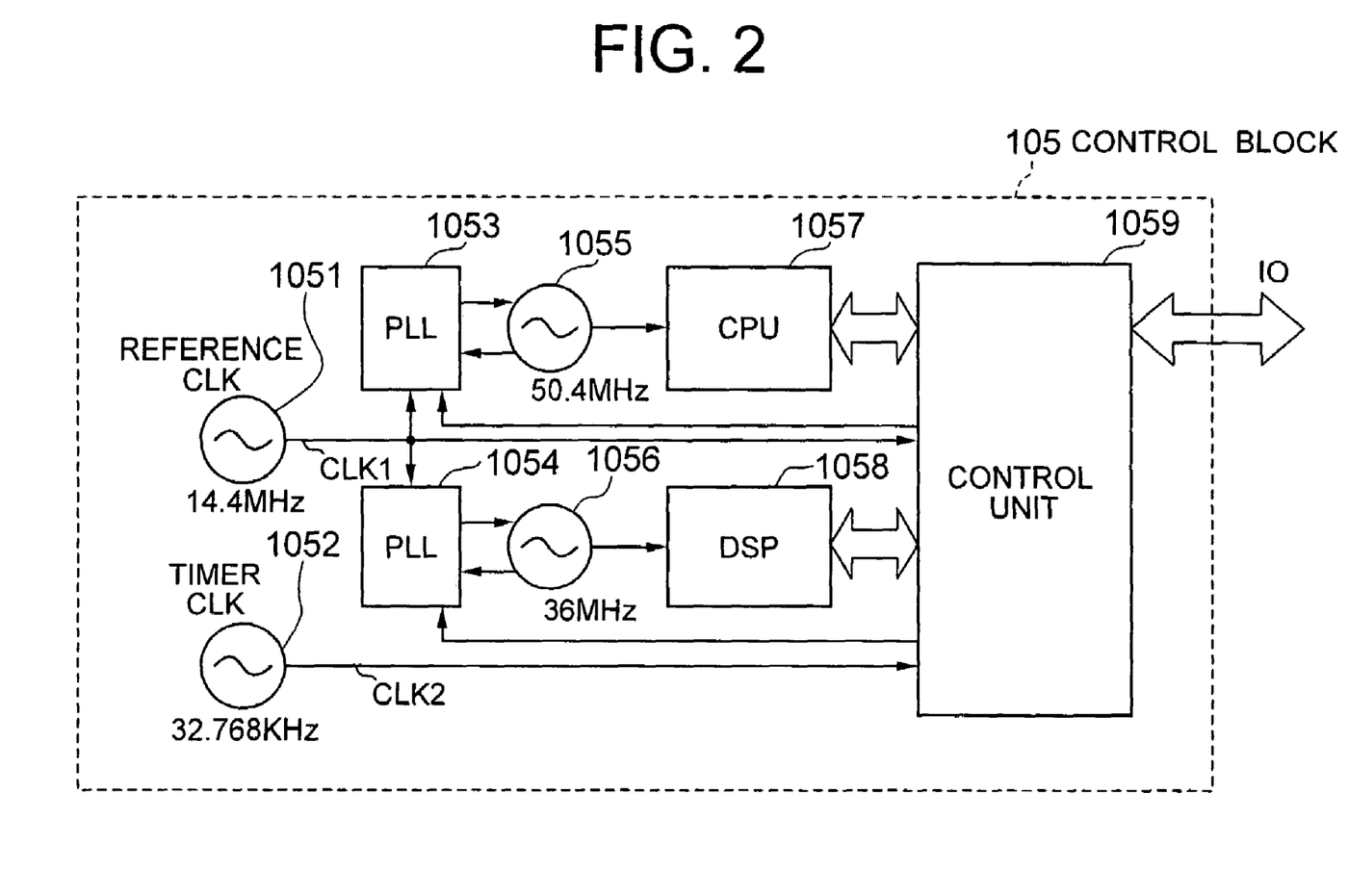
FIG. 2 is a detailed block diagram of the control block in the cellular phone of FIG. 1.

Referring to FIG. 2, the control block shown in FIG. 1 includes a reference clock oscillator 1051, a timer clock oscillator 1052, first and second PLL circuits 1053 and 1054, first and second voltage controlled oscillators 1055 and 1056, a CPU 1057, a DSP (digital signal processor) 1058, and a control unit 1059. The reference clock oscillator 1051 delivers a 14.4 MHz reference clock CLK1 to the control unit 1059 and the first and second PLL circuits 1053 and 1054, the latter using the reference clock CLK1 for comparison.

The timer clock oscillator 1052 delivers a 32.768 MHz timer clock CLK2 to the control unit 1059, and is used as a clock for timers. The first PLL circuit 1053 is connected to the first voltage controlled oscillator 1055 to configure a first PLL oscillator. The output of the first voltage controlled oscillator 1055 is connected. to the CPU 1057 and delivers a CPU clock. The CPU 1057 is connected to the control unit 1059 via a bus for controlling the operations in the cellular phone based on programs stored in a memory (not shown). The control unit 1059 controls the dividing ratio of the first PLL circuit 1053.

The second PLL circuit 1054 is connected to the second voltage controlled oscillator 1056 to configure a second PLL oscillator. The output of the second voltage controlled oscillator 1056 is connected to the DSP 1058 and delivers a DSP clock. The voltage controlled oscillators 1055 and 1056 may be replaced by current controlled oscillators. The DSP 1058 is connected to the control unit 1059 via a bus for operating arithmetic calculations, such as encoding and decoding, of the digital signals for the control unit 1059.

The control unit 1059 controls the dividing ratio of the second PLL circuit 1054. The control unit 1059 is connected to the external circuit blocks outside the control blocks 105 for controlling the external circuit blocks.

Figure 3:
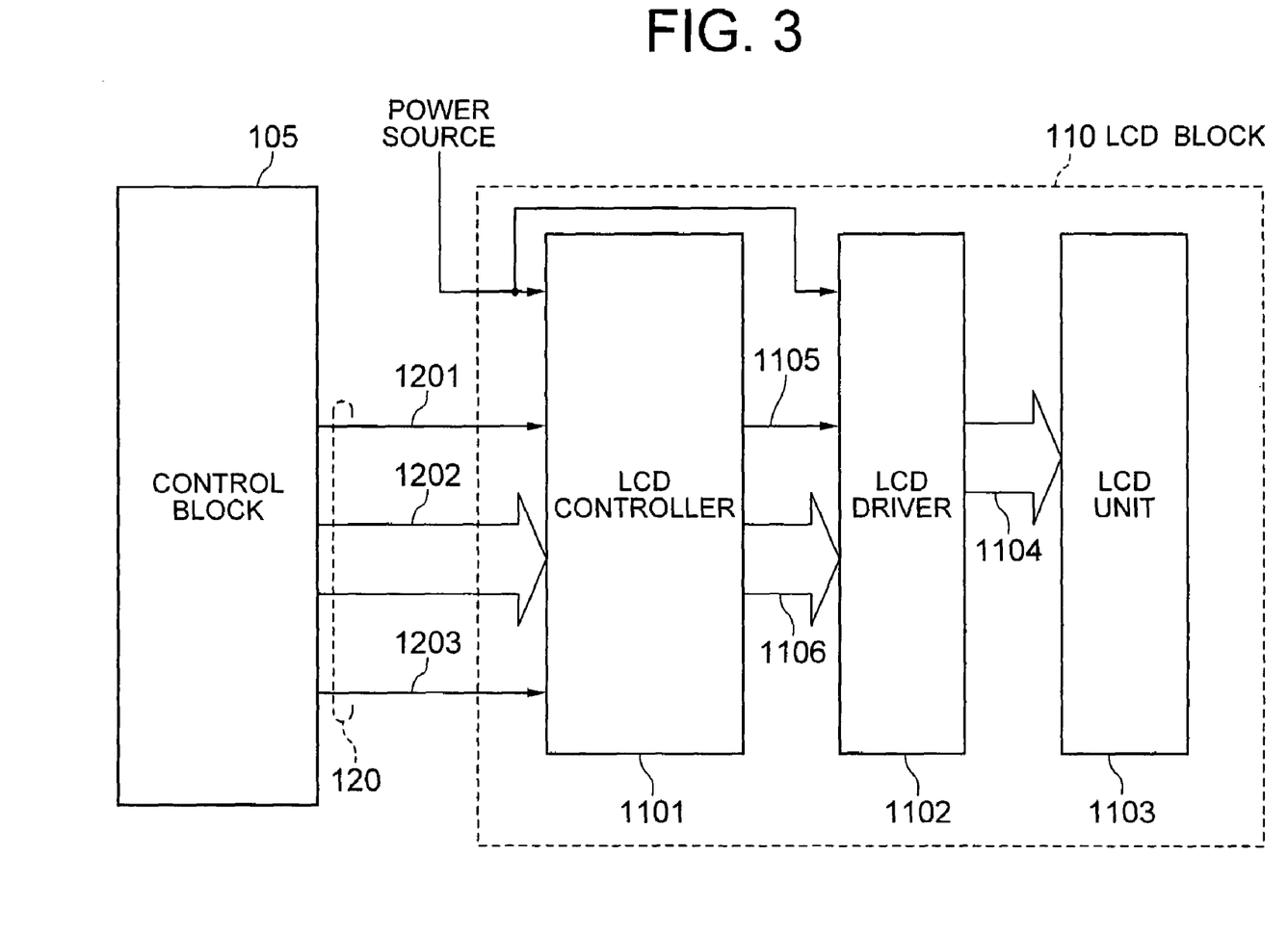
FIG. 3 is a detailed block diagram of the LCD block in the cellular phone of FIG. 1.

Referring to FIG. 3, the control block 105 is connected to the LCD block 110 via a bus 120. The LCD block includes an LCD controller 1101, an LCD driver 1102 and an LCD panel (LCD unit) 1103. The bus 120 includes a clock line 1201 through which the CPU clock is delivered to the LCD controller 1101, a signal line 1203 through which received frame signal generated by the digital baseband block 104 is delivered to the LCD controller 1101, and a data bus 1202 through which signals for controlling the LCD controller 1101 are delivered.

The LCD controller 1101 divides the CPU clock to generate a data clock signal, which is delivered to the LCD driver 1102 through a clock line 1105. The LCD controller 1101 transmits image data to the LCD driver 1102 through a data bus 1106. The LCD driver 1102 drives cells (pixels) of the LCD panel 1103 via a data bus 1104.

Figure 4:
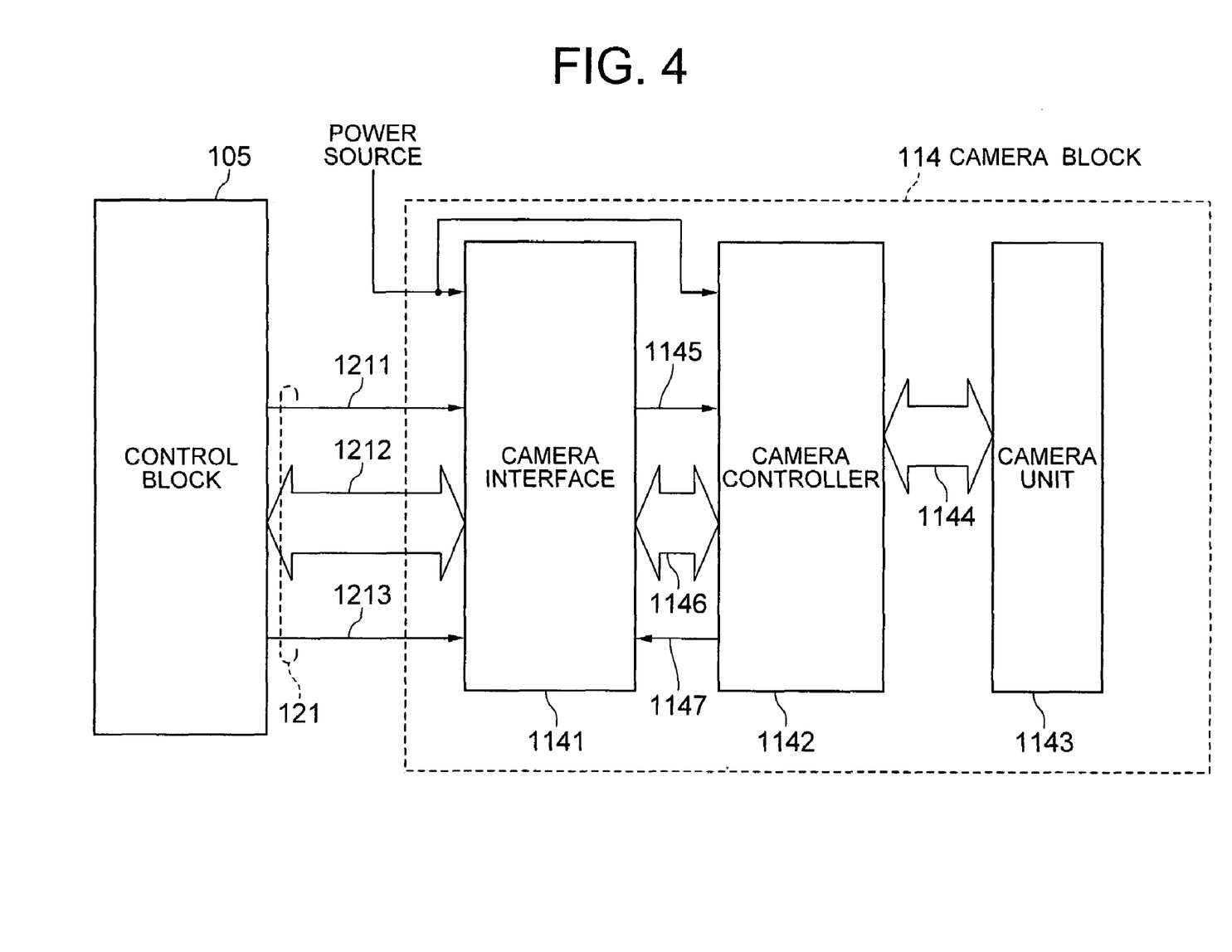
FIG. 4 is a detailed block diagram of the camera block in the cellular phone of FIG. 1.

Referring to FIG. 4, the control block 105 is connected via a bus 121 for controlling the camera block 114 in the cellular phone. The camera block 114 includes a camera interface 1141, a camera controller 1142 and a camera unit 1143. The bus 121 includes a clock line 1211 through which the CPU clock is delivered to the camera interface 1141, a signal line 1213 through which received frame signal generated by the digital baseband block 104 is delivered to the camera interface 1141, and a data bus 1212 through which the camera block 114 is controlled by the control block 105.

The camera interface 1141 divides the CPU clock to generate a data clock, which is delivered to the camera controller 1142 through a clock line 1145. The camera interface 1141 delivers control data to the camera controller 1142 through a data bus 1146. The camera controller 1142 controls the camera unit through a bus 1144. The camera controller 1142 operates for processing of the image data obtained by the camera unit 1143. The cameral controller 1142 delivers the image data thus processed to the camera interface 1141 through the data bus 1146. The camera controller 1142 also delivers a data clock to the camera interface 1141 through a clock line 1147, the data clock being obtained by dividing by two the original data clock delivered from the camera interface 1141.

Referring back to FIG. 2, in the operation of the control block 105, the reference clock oscillator 1051 generates a 14.4 MHz clock signal, which is divided by the first PLL circuit 1053 by four to generate a 3.6 MHz frequency signal. The first voltage controlled oscillator 1055 multiplies the 3.6 MHz frequency signal by fourteen and generates a 50.4 MHz CPU clock signal in association with the first PLL circuit 1053 while using phase comparison.

The 14.4 MHz clock signal generated by the reference clock generator 1051 is also divided by the second PLL circuit 1054 by four to generate another 3.6 MHz frequency signal. The second voltage controlled oscillator 1056 multiplies the 3.6 MHz frequency signal by ten to generate a 36 MHz DSP clock signal in association with the second PLL circuit 1054 while using phase comparison. The control unit 1059 delivers and receives control/data signals via external I/O circuits.

Figure 5:
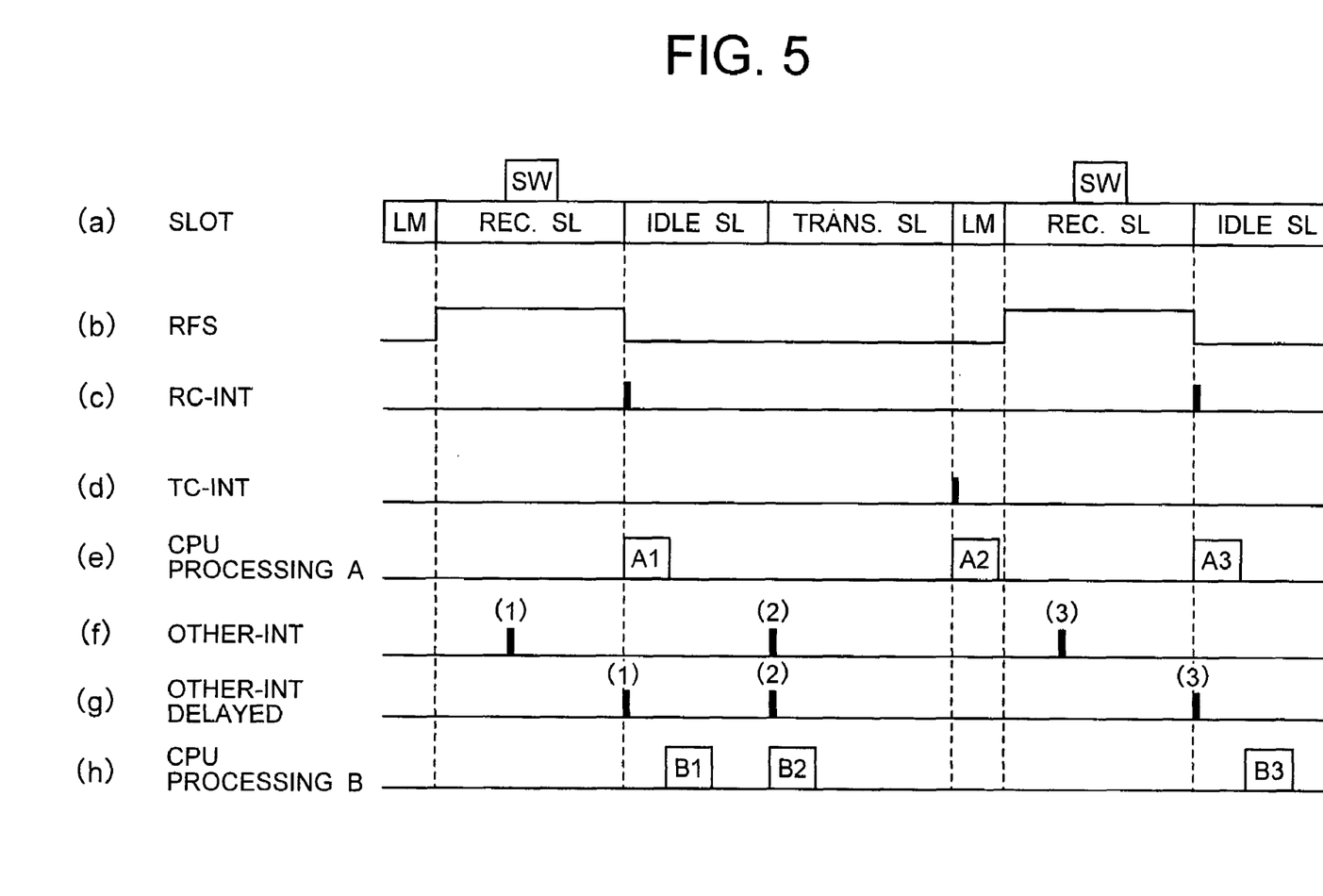
FIG. 5 is a timing chart illustrating the operations in the CPU during data reception/transmission.

Referring to FIG. 5, there is shown a timing chart for the control signals generated by the digital baseband block 104 and the control block 105. In a cellular phone using a time division multiple access (TDMA) technique, such as a personal digital cellular (PDC) standard prescribed in ARIB STD-27, a sink word signal having a specified data row is inserted at the location of specified data bits of received time-multiplexed data. In the example of FIG. 5, "SW" in the receiving slot on the top row (a) corresponds to the sink word signal. The slots of the cellular phone shown on the first row (a) include a level measurement slot (LM), receiving slot (Rec. SL), idle slot (Idle SL) and a transmitting slot (Trans. SL).

The digital baseband block 104 detects the sink word signal SW by using a pattern matching technique to operate frame synchronization, thereby generating a receiving frame signal RFS having an active high level for the receiving slot, as shown in the second row (b) in FIG. 5. The receiving frame signal RFS is delivered from the digital baseband block 104 to the control block 105 through the data bus.

When the control block 105 receives an interrupt signal (Other-INT) from a man-machine interface such as for the key input in the keyboard 109, as shown on the row (f) of FIG. 5, the control block 105 examines whether or not the receiving frame signal RFS assumes an active high level. If the receiving frame signal RFS assumes an inactive low level, such as for the case of occurring of the interrupt signal (2) on the row (f), the control block 105 passes the interrupt signal (2) to the CPU 1057, as shown on the row (g) in FIG. 5.

On the other hand, if the receiving frame signal RFS assumes an active high level when the control block 105 receives an interrupt signal, such as for the case of interrupt signal (1) or (3) on the row (f), the control block 105 delays the interrupt signal, and delivers the interrupt signal after the receiving frame signal RFS falls to an inactive low level, as shown on the row (g) of FIG. 5.

If a plurality of interrupt signals occur at a time, the CPU 1057 prosecutes the operation in the order of the priorities for the interrupt signals.

More specifically, in the example shown in FIG. 5, the interrupt signal (1) on the row (f) specifying a less-significant processing B1 is delayed by the control block 105, which passes the interrupt signal (1) after the receiving frame signal RFS falls to an inactive low level. Since the CPU 1057 receives a receipt-completed interrupt signal RC-INT on the third row (c) concurrently with the delayed interrupt signal (1) on the row (g), the CPU 1057 treats the significant processing A1 corresponding to the receipt-completed interrupt signal RC-INT before treating the less-significant processing B1 corresponding to the interrupt signal (1).

Since the interrupt signal (2) on the row (f) occurs during an inactive level of the receiving frame signal RFS, the control block 105 passes the interrupt signal (2) as shown on the row (g). The CPU operates for the processing B2 corresponding to the interrupt signal (2) right after the receipt of the interrupt signal (2). The control block 105 stops delivery of the CPU clock during the active high level of the receiving frame signal RFS.

It is to be noted that, if the receiving frame signal RFS is activated when the CPU 1057 operates for processing, the control block 105 allow the CPU 1057 to halt the operation and then restart the operation after the receiving frame signal RFS is inactivated. This is applied to any other controller or block that uses a bus for signal transmission.

Referring back to FIG. 3, for the operation of the LCD block 110, the control block 105 delivers the CPU clock signal to the LCD controller 1101 through the clock line 1201. The LCD controller 1101 divides the CPU clock signal by five to generate a synchronizing clock signal, which is delivered to the LCD driver 1102 through the clock line 1105. The LCD controller 1101 delivers data signal to the LCD driver 1102 through the synchronizing data bus 1106 based on the synchronizing clock signal.

The LCD controller 1101 receives the receiving frame signal RFS from the control block 105 through the signal line 1203. The LCD controller 1101 monitors the receiving frame signal RFS, and stops delivery of the data signal and data clock signal to the LCD driver during a high active level of the receiving frame signal RFS.

Referring back to FIG. 4, for the operation of the camera block, the control block 105 delivers the CPU clock signal to the camera interface 1141 through the clock line 1211. The cameral interface 1141 divides the CPU clock signal by six to generate a synchronizing clock signal, which is delivered to the camera controller 1142 through the clock line 1145. The camera interface 1141 delivers data signal through the synchronizing data bus 1146 based on the synchronizing clock signal.

The camera interface 1141 also receives the receiving frame signal RFS from the control block 105 through the signal line 1213. The cameral interface 1141 monitors the receiving frame signal RFS, and stops delivery of the data clock signal and the data signal to the camera controller 1142.

The camera controller 1142 treats the image data obtained from the CCD camera 1143 to deliver the treated image data to the camera interface 1141. The camera controller 1142 divides the data clock signal delivered from the camera interface 1141 by two to thereby generate a divided data clock, which is delivered to the camera interface 1141 through the clock line 1147. The camera controller 1142 delivers the image data to the camera interface 1141 through the data bus 1146 in synchrony with the divided data clock. The camera controller 1142 stops delivery of the image data during the stop of the data clock.

Figure 6:
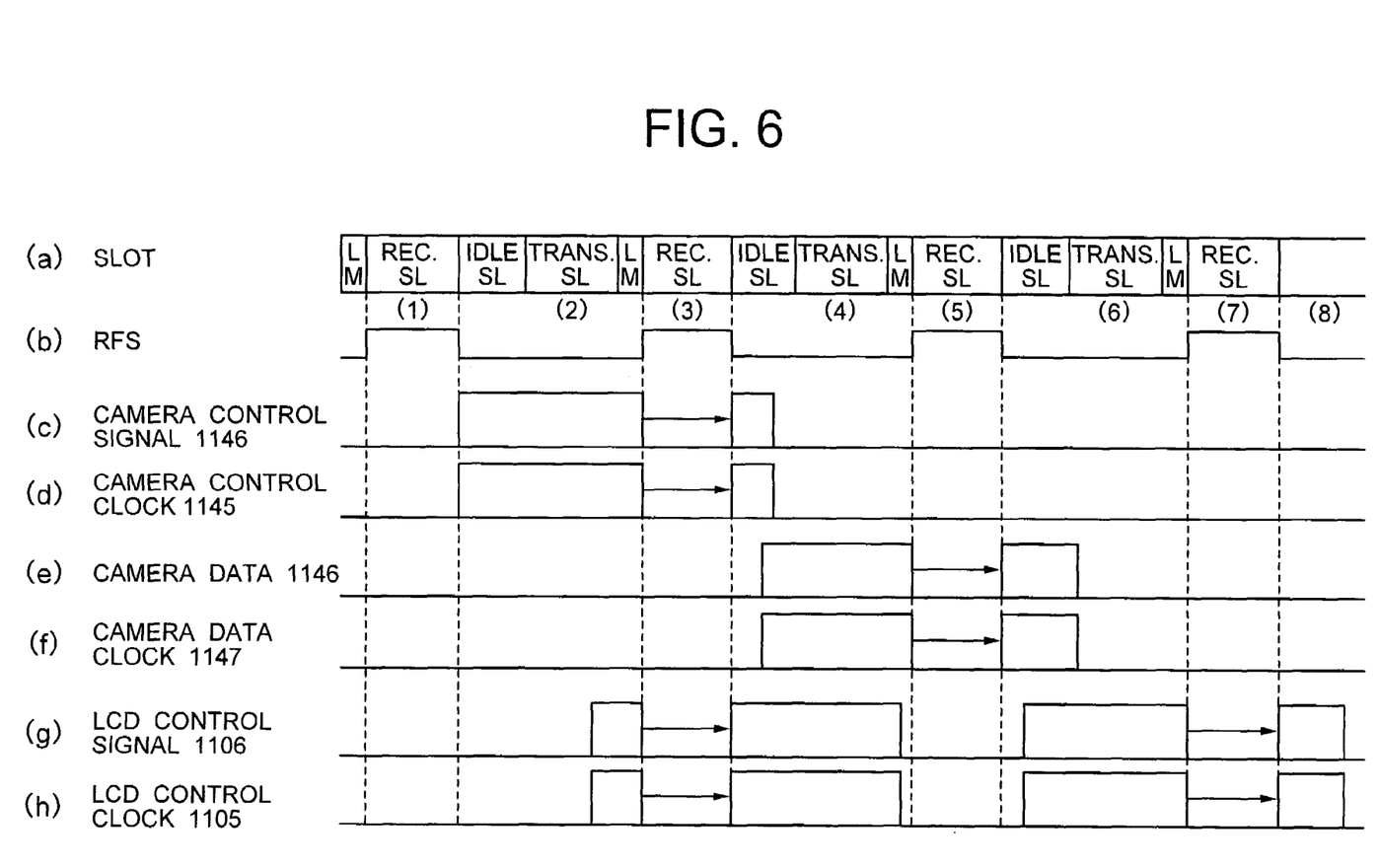
FIG. 6 is a timing chart illustrating the control operations in the LCD block and camera block during data reception/transmission.

FIG. 6 shows, similarly to FIG. 5, control operations for the LCD block 110 and camera block 114, corresponding to FIG. 11 shown in connection with the conventional technique. After the receiving frame signal RFS falls to an inactive low level, the camera interface 1141 delivers the camera control signals through the data bus 1146 in synchrony with the camera clock signal to the camera controller 1142. These signals are stopped during the next active high level of the receiving frame signal RFS, restarted and completed during the next inactive low level of the receiving frame signal RFS. During the same inactive low level of the receiving frame signal RFS, the camera controller 1142 responding to the control signals delivers the image data through the data bus 1146 to the camera interface 1141 in synchrony with the divided clock signal. These signals are stopped during the next active high level of the receiving frame signal RFS, restarted and completed during the next inactive level of the receiving frame signal RFS.

The LCD controller 1101 delivers LCD control signals through the data bus 1106 to the LCD driver 1102 in synchrony with the LCD clock signal during an inactive low level of the receiving frame signal RFS and stops during the next active high level of the receiving frame signal RFS. These signals are stopped during the active high level of the receiving frame signal RFS and restarted after the receiving frame signal RFS falls to an inactive low level.

In the present embodiment of the cellular phone, the CPU stops its operation during the receiving frame intervals, thereby stopping data transfer through the data bus between the CPU and the memory. In addition, LCD control data, camera control data and camera image data are also stopped during the receiving frame interval are also stopped for data transfer through the data buses. The stop of data transfer through the data buses prevents degradation of the receiving sensitivity in the cellular phone.

The stop of the data transfer allows reduction of the LC filters and shield members for the data bus, which reduces the components, weight, dimensions and costs of the cellular phone.

The monitoring of the receiving frame signal may be effected by the control block itself, which may control the overall operations of the cellular phone to stop the operation of the CPU and data transfer through the data bus between the components.

If there is any other CPU outside the control block of the cellular phone, such as a baseband CPU, display CPU or camera CPU, the other CPU may be also stopped for operation by the control block monitoring the receiving frame signal.

Since the above embodiments are described only for examples, the present invention is not limited to the above embodiments and various modifications or alterations can be easily made therefrom by those skilled in the art without departing from the scope of the present invention.

What is claimed is:

1. A cellular phone comprising:
a radio circuit block including an antenna; an analog baseband block connected to said radio circuit block; a digital baseband block connected to said analog baseband block; and a control block for controlling operation of said blocks, said control block including a central processing unit (CPU) for treating data input from said blocks and a keyboard, said radio circuit block receiving a radio signal through said antenna during a receiving slot, wherein said control block stops operation of said CPU during said receiving slot.

2. The cellular phone according to claim 1, wherein said control block retains an interrupt signal during said receiving slot and delivers said interrupt signal to said CPU after said receiving slot is finished, said interrupt signal requesting said CPU to operate a specified data processing.

3. The cellular phone according to claim 2, wherein said control block delivers a plurality of interrupt signals based on priority orders of said interrupt signals after said receiving slot is finished.

4. The cellular phone according to claim 1, further comprising:
at least one of display block and camera block, wherein said at least one of display block and camera block stops data transfer through an associated bus during said receiving slot.

5. The cellular phone according to claim 4, wherein said display block includes an LCD unit, an LCD driver for driving pixels of said LCD unit, an LCD controller for receiving image data from said control block to deliver said image data to said LCD driver, and wherein said LCD controller stops data transfer between the same and said LCD driver during said receiving slot.

6. The cellular phone according to claim 5, wherein said camera block includes a camera, a cameral controller for controlling said camera, and a camera interface for passing there through control signals from said control block to said cameral controller and passing there through image data from said LCD controller to said control block, wherein said camera controller and said camera interface stop data transfer there between during said receiving slot.

7. The cellular phone according to claim 1, wherein said digital baseband block generates a receiving frame signal having an inactive level during said receiving slot.

8. The cellular phone according to claim 1, wherein said control block stops delivery of a clock signal used for transmitting data through a data bus during said receiving slot.

9. A cellular phone comprising: a radio circuit block including an antenna; an analog baseband block connected to said radio circuit block; a digital baseband block connected to said analog baseband block; at least one of display block and camera block, and a control block for controlling operation of said blocks, said control block including a central processing unit (CPU), said radio circuit block receiving a radio signal through said antenna during a receiving slot, wherein said at least one of display block and camera block stops data transmission through an associated bus during said receiving slot.

10. The cellular phone according to claim 9, wherein said control block stops delivery of a clock signal used for transmitting image data through said associated bus by said at least one of display block and camera block.

11. A method for controlling a cellular phone having a CPU for controlling operation of the cellular phone and an operation of said CPU being in response to an interrupt signal, said method comprising:
 detecting a receiving slot to activate a receiving frame signal;
 delaying said interrupt signal for operating said CPU during a time interval when said receiving frame signal is active;
 applying said interrupt signal to the CPU after said receiving frame signal is inactivated; and
 operating said CPU in response to said interrupt signal.

12. The method according to claim 11, further comprising:
 stopping operation of said CPU when said receiving frame signal is activated; and
 restarting operation of said CPU after said receiving frame signal is inactivated.

13. The method according to claim 11, further comprising:
 halts a data transfer through a data bus when said receiving frame signal is activated; and
 restarts said data transfer through the data bus after said receiving frame signal is inactivated.

14. A program stored in a medium for running on a CPU in a cellular phone, said program:
 detectings a receiving slot to activate a receiving frame signal;
 delaying an interrupt signal for operating said CPU during a time interval when said receiving frame signal is active;
 applying said interrupt signal to the CPU after said receiving frame signal is inactivated; and
 operating said CPU in response to said interrupt signal.

15. The program according to claim 14, wherein said program further:
 stops operation of said CPU when said receiving frame signal is activated; and
 restarting operation of said CPU after said receiving frame signal is inactivated.

16. The program according to claim 14, wherein said program further:
 halts a data transfer through a data bus when said receiving frame signal is activated; and
 restarts said data transfer through the data bus after said receiving frame signal is inactivated.

* * * * *